US010385489B1

(12) United States Patent
Davis (10) Patent No.: US 10,385,489 B1
(45) Date of Patent: Aug. 20, 2019

(54) NON-WOVEN FLAME-RETARDANT MATERIAL

(71) Applicant: Wm. T. Burnett IP, LLC, Baltimore, MD (US)

(72) Inventor: Gregory B. Davis, Owings Mills, MD (US)

(73) Assignee: Wm. T. Burnett IP, LLC, Baltimore, MD (US)

( * ) Notice: Subject to any disclaimer, the term of this patent is extended or adjusted under 35 U.S.C. 154(b) by 517 days.

(21) Appl. No.: 14/614,024

(22) Filed: Feb. 4, 2015

(51) Int. Cl.
| | |
|---|---|
| *D04H 1/558* | (2012.01) |
| *D01G 15/00* | (2006.01) |
| *D01G 13/00* | (2006.01) |
| *D04H 1/42* | (2012.01) |
| *D04H 1/54* | (2012.01) |
| *B29C 51/00* | (2006.01) |
| *B29C 51/42* | (2006.01) |
| *B29L 31/00* | (2006.01) |
| *B29K 105/00* | (2006.01) |
| *B29K 67/00* | (2006.01) |

(52) U.S. Cl.
CPC ........... *D04H 1/558* (2013.01); *B29C 51/002* (2013.01); *B29C 51/421* (2013.01); *D01G 13/00* (2013.01); *D01G 15/00* (2013.01); *D04H 1/42* (2013.01); *D04H 1/54* (2013.01); *B29K 2023/06* (2013.01); *B29K 2067/003* (2013.01); *B29K 2105/253* (2013.01); *B29K 2995/0016* (2013.01); *B29L 2031/772* (2013.01); *D10B 2201/28* (2013.01); *D10B 2321/021* (2013.01)

(58) Field of Classification Search
CPC ............ D04H 1/558; D04H 1/42; D04H 1/54; B29C 51/421; B29C 51/002; D01G 13/00; D01G 15/00; B29K 2023/06; B29K 2105/253; B29K 2995/0016; B29K 2067/003; D10B 2201/28; D10B 2321/021; B29L 2031/772
See application file for complete search history.

(56) References Cited

U.S. PATENT DOCUMENTS

| 7,410,920 | B2 | 8/2008 | Davis | |
| 7,878,301 | B2 | 2/2011 | Gross et al. | |
| 8,361,912 | B2 | 1/2013 | Block et al. | |
| 2005/0215142 | A1* | 9/2005 | Bascom | ............... A47C 31/001 442/35 |

OTHER PUBLICATIONS

Celanese Acetate, Complete Textile Glossary, 2001, Celanese Acetate LLC, pp. 16 and 107 (Year: 2001).*

(Continued)

*Primary Examiner* — Brian Handville
(74) *Attorney, Agent, or Firm* — Plumsea Law Group, LLC (57) ABSTRACT

A thermoformable non-woven material that meets at least one of the UL94 V-0 (2013) flammability standard and the ASTM E84-14 (2014) flammability standard. The material may include charring fiber having a denier per fiber at least about 3 and binding fiber having a denier per fiber between about 1 and about 8. The weight ratio of charring fiber to binding fiber may be between about 2:1 and about 4:1, and the denier per fiber of the charring fiber may be at least about twice the denier per fiber of the binding fiber.

21 Claims, 6 Drawing Sheets

(56) References Cited

OTHER PUBLICATIONS

Nazaré et al., "A review of fire blocking technologies for soft furnishings", Nazaré and Davis Fire Science Reviews 2012, 1:1, http://www.firesciencereviews.com/content/1/1/1—Fire Science Reviews—a SpringerOpen Journal, pp. 1-23.
UL94V-0, V-1, V-2 Specifications—UL Test Procedures, Datasheet [online]. Port Plastics, p. 25, [retrieved on Aug. 8, 2017] Retrieved from the internet: <URL: https://media.digikey.com/pdf/Other%20Related%20Documents/GC%20Elect/UL_Test_Procedure.pdf.
UL94V-0, V-1, V-2 Flammability Standard, Datasheet [online], RTP Company, [retrieved on Aug. 8, 2017] Retrieved from the internet: <URL: http://web.rtpcompany.com/info/ul/ul94v012.htm.

* cited by examiner

NON-WOVEN FLAME-RETARDANT MATERIAL

BACKGROUND

The present disclosure relates generally to non-woven flame-retardant material. In particular, the disclosure relates to non-woven flame-retardant material that meets the UL94 V-0 (2013) flammability standard. The disclosure also relates to non-woven flame-retardant material that meets the ASTM E84-14 (2014) flammability standard. The disclosure also relates to a method of making the material and a method of making an article material.

Flammability standards exist for many products, such as, for example, clothing, bedding, building materials, vehicle parts, and appliances. Various solutions to fire retardancy may be taken. For example, in some applications, such as vehicles, including heavy equipment, and commercial and residential appliances, fiberglass, with or without a binder, often is used. In other applications, a combination of fibers may be used. For example, one solution is to combine low-denier charring fiber with higher-denier binding fiber to meet federal flammability standards for bedding.

Many liners or panels for application to vehicles are well known in the art. Typically, these liners are intended to both absorb sound and protect nearby structures and occupants of the vehicle from heat and flame. Further, to serve as a hood liner, a dash liner, a firewall liner, or a heat shield such as in the vicinity of a transmission, a muffler, or catalytic converter, vehicle manufacturers typically require that such a liner or panel be flame retardant. Thus, sound attenuation, thermal shielding, and flame retardancy are important properties for such liners or panels.

One popular form of such panels includes a laminate incorporating (a) one or more layers to provide the desired acoustical and thermal insulating properties and (b) one or more additional layers to provide the desired mechanical strength. However, lamination may require adhesives, which may tend to fail or delaminate over time. Further, many liners and insulators are subjected to water and aqueous salt slurries from the surface of the roadways. Many such panels do not hold their shape when wet, hot, or aged.

Materials often used for such panels comprise fiberglass and melamine polyurethane foam. However, fiberglass may present some issues with regard to handling and molding.

Articles comprising materials of the disclosure also may be used in, for example, interiors of buildings. Panels that are flame-retardant have many uses in interior applications. In particular, panels that retain their shape may be more convenient to use than, for example, fiberglass batts or similar materials.

Therefore, there exists a need for a thermoformable material that meets industry-standard tests for flame-retardant performance and maintains shape under typical conditions of use. Such a material may be suitable for use as a liner in the high temperature operating environment in various locations on a vehicle, including heavy equipment, and may serve not only to protect surrounding equipment and passengers from high temperature and flame, but also may serve to attenuate sound. The material also may be suitable for interiors of buildings, in commercial and household appliances, and in other locations in which fiberglass typically is used.

SUMMARY

The disclosure is directed to non-woven flame-retardant material. In particular, the disclosure relates to non-woven flame-retardant material that meets the UL94 V-0 (2013) flammability standard. The disclosure also relates to non-woven flame-retardant material that meets the ASTM E84-14 (2014) flammability standard. The material may comprise charring fiber, binding fiber, and less than about 10 wt percent, based on the total weight of the charring fiber and binding fiber, of compositions selected from the group consisting of non-charring fiber, flame retardants, and blends thereof.

The material may comprise charring fiber having a denier per fiber (dpf) of at least about 3 and typically between about 3 and about 16. The material also may comprise binding fiber having a denier per fiber between about 1 and about 8, typically between about 1 and about 5, and more typically between about 1 and about 3. The denier per fiber of the charring fiber may be at least about twice the denier per fiber of the binding fiber. The weight ratio of charring fiber to binding fiber may be between about 2:1 and about 4:1.

The disclosure also is directed to an article comprising the material, to a method for manufacturing the material, and to a method for manufacturing the article.

Other systems, methods, features, and advantages of the present embodiments will be, or will become, apparent to one of ordinary skill in the art upon examination of the following figures and detailed description. It is intended that all such additional systems, methods, features and advantages be included within this description and this summary, be within the scope of the present embodiments, and be protected by the following claims.

BRIEF DESCRIPTION OF THE DRAWINGS

The present embodiments can be better understood with reference to the following drawings and description. The components in the figures are not necessarily to scale, emphasis instead being placed upon illustrating the principles of the present embodiments. Moreover, in the figures, like reference numerals designate corresponding parts throughout the different views.

DETAILED DESCRIPTION

The disclosure is directed to non-woven flame-retardant material. In particular, the disclosure relates to non-woven flame-retardant material that meets the UL94 V-0 (2013) flammability standard. The disclosure also relates to non-woven flame-retardant material that meets the ASTM E84-14 (2014) flammability standard. The material may comprise charring fiber, binding fiber, and less than about 10 wt percent, based on the total weight of the charring fiber and binding fiber, of compositions selected from the group consisting of non-charring fiber, flame retardants, and blends thereof.

The material may comprise charring fiber having a denier per fiber of at least about 3 and typically between about 3 and about 16. The material also may comprise binding fiber having a denier per fiber between about 1 and about 8, typically between about 1 and about 5, and more typically between about 1 and about 3. The denier per fiber of the charring fiber may be at least about twice the denier per fiber of the binding fiber. The weight ratio of charring fiber to binding fiber may be between about 2:1 and about 4:1.

The disclosure also is directed to an article comprising the material, to a method for manufacturing the material, and to a method for manufacturing the article.

Embodiments of thermoformable non-woven material disclosed herein meet a flammability standard of an organization or code relevant to the use of the material. For example, a significant use of material of the disclosure relates to manufacture of vehicles. The flammability standard UL94 V-0 (2013) has been adopted for evaluating flame-retardant materials for use in vehicles. Use of the material in vehicles is made more complex by the weight and thickness limitations imposed by vehicle manufacturers. Vehicle manufacturers also impose sound attenuation requirements. Flammability standard ASTM E84-14 (2014) provides a method for evaluating surface burning characteristics of building materials.

Embodiments of material of the disclosure are thermoformable, or moldable, at a temperature above the melting temperature of the binding fiber. That is, the material may be heated to a softening temperature of a binder present and then shaped in a mold. The material retains this molded shape upon cooling. The ability to sustain or retain a shape, whether flat or contoured, for example, contoured to fit around other devices, is known as "moldability."

Flame retardancy for use in some automobile applications may require that a product withstand a temperature of about 125° C. for between about 1400 hours and about 3000 hours and 150° C. for about 60 hours. The UL94 V-0 (2013) flammability standard is the highest level, or most strict level, of flame retardancy, and includes tests for flammability of polymeric materials. The tests include impingement of an open flame or exposure to a radiant heat source. Determinations may be made regarding horizontal burning, vertical burning, and radiant panel flame spread, as appropriate for the use of the material or article.

In some embodiments, material of the disclosure may be used as interior finishing products used in building construction. Such articles often are called "architectural panels." Standards and building codes often are established locally, often on a state-by-state basis. Therefore, there exist many local and regional building codes established by both government and industry. Indeed, some organizations sanction the use of a single standard under different titles and number identifications. For example, the standards ANSI/UL 723, NFPA 255, and ASTM E84 all are names for the same test. These tests may be useful in characterizing or quantifying material or architectural articles of the disclosure. For example, ASTM E84-14 (2014) characterizes surface flame spread and smoke density upon exposure to flame.

In accordance with embodiments of the disclosure, the thermoformable non-woven material comprises charring fiber and binding fiber. Charring fiber and binding fiber may each comprise a single type of fiber or multiple fibers. For example, charring fiber may comprise flame-retardant rayon fiber and similar fibers that leave a carbonaceous residue after contact with high heat or a flame. Charring fiber may ignite, but is self-extinguishing, combusting incompletely upon exposure to high heat. Charring fiber thus may maintain a structure, even after burning.

In some embodiments, charring fiber may be flame-retardant rayon, a composition known to the skilled practitioner. Typically, flame-retardant rayon, such as Visil®, may be formed with a silicic spine. Other charring fibers include modified viscose fibers; KNAPF fibers; cotton fibers; melamine fibers, such as Basofil®; and modified cellulose fibers.

Charring fiber may have a denier of at least about 3 and typically between about 3 and about 16, more typically between about 3 and about 12, and even more typically between about 3 and about 6. In some embodiments, a charring fiber including more than one filament may have a denier per fiber (total denier/quantity of uniform filaments) of between about 3 and about 6. In some embodiments, the charring fiber may have a denier, or a denier per fiber, between about 4 and about 5.

Analogously, binding fiber may comprise a single type of fiber or multiple fibers. Binding fiber may be selected from a fiber that melts at least partially during exposure to heat. Binding fiber typically melts, at least partially, at a temperature between about 110° C. and about 200° C. Thus, a fiber may be selected that will melt at a selected temperature. HTLM polyesters, PET, and polyolefins, such as polyethylene and polypropylene, may serve as binding fiber.

In some embodiments, a bi-component fiber may be used as a binding fiber. A bi-component fiber includes two components, one that melts at a first temperature and another that melts at a higher second temperature. Typically, the first temperature may be between about 110° C. and about 200° C., and the second temperature is higher, and typically above the temperature the material is expected to survive. One such binding fiber is a copolymer of PET in the core and a lower-melting PET sheath. Use of such fibers may afford the opportunity to thermally bond the charring fiber, binding fiber, and other fibers that may be present, to form a panel of thermally bonded fibers without losing the fiber shape of the binding fiber.

A bi-component fiber may have a core and sheath arrangement, an eccentric core and sheath arrangement, a pie arrangement, an islands-in-the-sea arrangement, a striped arrangement, a side-by-side arrangement, a lobed arrangement, or any other arrangement that provides an intimate combination of the two components. A lobed arrangement may be in the core and sheath style, or the lobes may be tipped with the lower-melting component. In these configurations, the ratio of components in the fiber may be established as selected by the user. In some embodiments, a core and sheath arrangement may be used. In some embodiments, the weight ratio of core to sheath may be about 1:1.

In some embodiments, the denier of the binding fiber may be between about 1 denier per fiber and about 8 denier per fiber, typically between about 1 denier per fiber and about 5 denier per fiber, and more typically between about 1 denier per fiber and about 3 denier per fiber, even more typically between about 1 denier per fiber and about 2.5 denier per fiber, and still more typically between about 1 denier per fiber and about 2 denier per fiber.

In some embodiments, the denier per fiber of charring fiber may be at least about twice the denier per fiber of the binding fiber. In contradistinction, fire barriers meeting United States federal flammability standards employ low-denier charring fiber, as disclosed in U.S. Pat. No. 7,851,392. Although the inventors do not wish to be bound by theory, retention of certain mechanical properties during molding and flammability testing may be attributable to the number of bonding points and the combination of (1) high denier per fiber of the charring fiber and (2) low denier per fiber of the binding fiber. Because lower denier fibers have a greater number of fibers present at a given weight, use of low-denier binder fibers facilitates bonding to each other and to the charring fibers and other fibers that may be present, within the size and proportion requirements to both meet the flammability standard, i.e., one of UL94 V-0 (2013) or ASTM E84-14 (2014), and form a moldable article. The greater number of binding fibers provides a greater number of binding sites.

In some embodiments, the weight ratio of charring fiber to binding fiber may be between at least about 2:1 and about 4:1. In some embodiments, the weight ratio of charring fiber to binding fiber may be between about 2.5:1 and about 3.75:1. The skilled practitioner would have expected that a weight ratio of charring fiber to bi-component binding fiber of greater than about 1.85:1 typically would not be suitable to manufacture a formable product. However, the greater ratio of charring fiber to binding fiber in embodiments of the disclosure meet the ASTM E84-14 (2014) or UL94 V-0 (2013) flammability standard, yet do not give rise to difficulties with molding as would have been expected by the skilled practitioner.

The material of some embodiments may also comprise less than about 10 wt percent, based on the total weight of the charring fiber and binding fiber, of compositions selected from the group consisting of non-charring fiber, flame retardants, and blends thereof. Such non-charring fiber may be selected from halogenated monomers, such as modacrylic fiber; halogenated monomers; flame-retardant polyester fiber; fiberglass; and other non-charring fibers.

In embodiments, the material typically may be formed into batts having a thickness between about 0.75 inches and about 3 inches, typically between about 0.75 inches and about 1.5 inches, more typically between about 0.9 inches and about 1.1 inches. The batts may be used directly to form articles, or may be pressed and heated to form panels having a thickness between about 10 mm and about 25 mm that are later formed into articles.

The disclosure also relates, in some embodiments, to a method for manufacturing the material. The method may comprise carding charring fiber and cross-lapping the carded fibers to form a batt. In some embodiments, the method may include adding binding fiber to create a fiber blend, and then thermally bonding the fibers by melting a low-melt temperature binder. The batts may form a material having a thickness between about 0.75 inches and about 3 inches, typically between about 0.75 inches and about 1.5 inches, typically about 1 inch. The fibers also may be bonded by pressing the batt to form a panel that later may be formed into an article, or may be formed directly into a flat panel article or a shaped article, any of which having a thickness between about 0.4 inches and about 1 inch (about 10 mm and about 25 mm). Articles more typically may have a thickness between about 0.5 inches and about 0.8 inches (about 12 mm and about 20 mm).

In some embodiments, the blend of non-woven fibers may have a basis weight of between about 0.4 osf and about 9 osf, and typically between about 0.40 osf and about 5 osf. In some embodiments, the blend of non-woven fibers may have a basis weight of between about 0.5 osf and about 9 osf, more typically between about 0.75 osf and about 4 osf.

The disclosure also relates, in some embodiments, to a method of manufacturing an article comprising the material disclosed herein. The material may be formed, then pressed to form a selected shape. Both flat and shaped articles are contemplated. In some embodiments, a flat article, such as one suited for interior use in an architectural panel, may be obtained in a flat bed system. Such a system is known to the skilled practitioner as a Meyers®-type system. In such a system, a double belt presses the material, optionally also bonding a decorative or protective layer to a surface, with integrated heating and cooling, to form a flat article. Any decorative or protective layer typically is insubstantial and has essentially no effect on flammability and acoustic properties and characteristics. The article may be heated to the softening point in any suitable method, such as by infrared radiation. The pressed or molded article then may be cooled to fix the shape.

In some embodiments, a shaped, i.e., not flat, article may be formed by heating thermoformable material of this disclosure to a temperature above the melting point of the binding fiber to 'activate' the binding fiber, and then shaping the material in a cold press, and then further cooling the article to retain the shape. The thermoformable material may be in the form of a flat and pressed panel or may be in the form of a batt before molding.

In some embodiments, a cold press is not necessary to form a shaped article. In these embodiments, a shaped article may be shaped after the thermo-bonding step, i.e., after thermoformable material is heated to a temperature above the melting point of the binder. The material may be shaped and then allowed to air-cool to harden into a shaped article.

In embodiments, the material may exhibit both flame retardancy and sound attenuation. The sound attenuation property is particularly advantageous for articles shaped for use in vehicles, but also is advantageous for flat architectural panels. Sound attenuation, also known as sound absorption, typically varies with frequency of the sound to be attenuated. Typically, attenuation improves as the frequency increases. In some embodiments, attenuation, as measured by an absorption coefficient, is less than about 10 percent at frequencies below about 350 Hz; about 50 percent at about 1500 Hz; and may exceed about 90 percent at a frequency of about 4000 Hz.

In some embodiments, material of the disclosure or an article of the disclosure may further include a scrim. A scrim is a reinforcement layer that may be woven or non-woven and made from polyester fibers, for example.

Material disclosed herein may have an essentially uniform density after pressing. That is, the density may be essentially constant throughout the pressed area of the article. The density at the faces of the material may be the same as than the density of the center core of the pressed area. Therefore, the fiber may be evenly dispersed throughout the material.

The following examples and comparative examples further illustrate, and are not intended to limit, the disclosure.

EXAMPLES

Comparative Examples 1 and 2

Two materials were formed into panels and tested under the UL94 V-0 (2013) flammability standard. The compositions, processing conditions, and product characteristics are set forth in the following table:

TABLE 1

| | | Comparative Example 1 | | Comparative Example 2 | |
|---|---|---|---|---|---|
| Charring fiber | | Flame-retardant rayon | | Flame-retardant rayon | |
| Wt percent | Denier | 77 | 3 | 62 | 3 |
| Binding fiber | | HTLM polyethylene | | HTLM polyethylene | |
| Wt percent | Denier | 20 | 4 | 35 | 4 |

TABLE 1-continued

|  | Comparative Example 1 | Comparative Example 2 |
|---|---|---|
| Non-charring fiber, wt pct | Silex ®, 3 | Silex ®, 3 |
| Wt charring fiber/Wt binding fiber | 3.85 | 1.77 |
| Charring fiber, denier per fiber/Binding fiber, denier per fiber | 0.75 | 0.75 |
| UL94 V-0 (2013) | Pass | Fail |
| Moldability | Fail | Pass |

The inventors observed that the charring fiber material of Comparative Example 2 exhibited a glow when exposed to ignition sources. Although the inventors do not wish to be bound by theory, it is believed that these glowing fibers ignited the volatile materials liberated from the binding fiber, thus causing Comparative Example 2 to fail the UL94 V-0 (2013) test.

Figure 1:
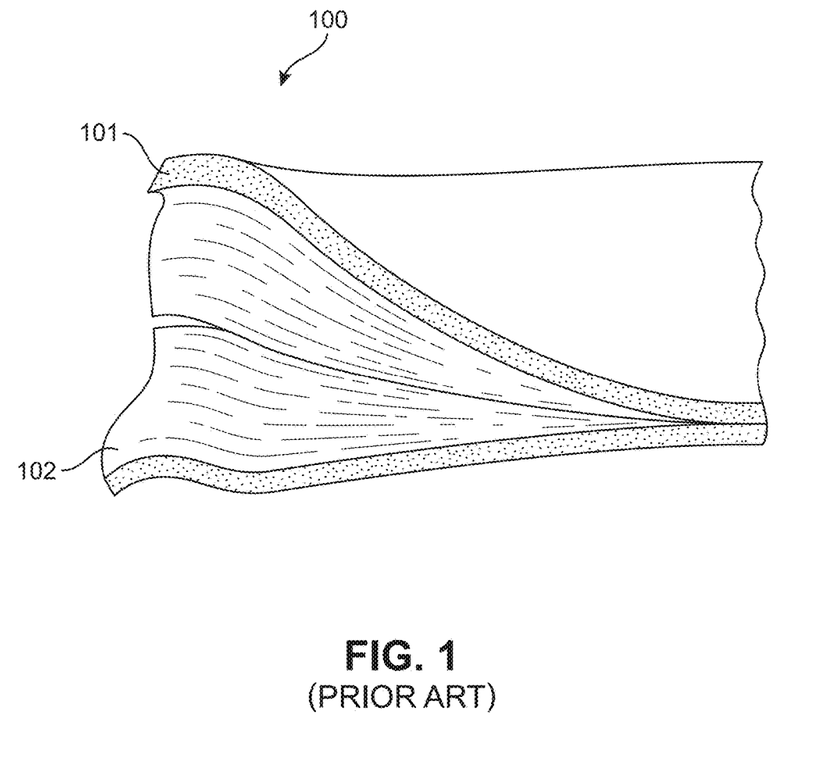
FIG. 1 is a schematic diagram of a perspective view of a material that does not mold.

The inventors also observed that the material of Comparative Example 1 lacked sufficient bonds in the center area, thus causing it to fail the 'moldability' test. FIG. 1 illustrates this failure to form sufficient bonds for Comparative Example 1. FIG. 1 illustrates panel 100, which has separated into top layer 101 and bottom layer 103. The layers separate with no effort because the panel exhibits essentially no bonding strength in the center.

Figure 2:
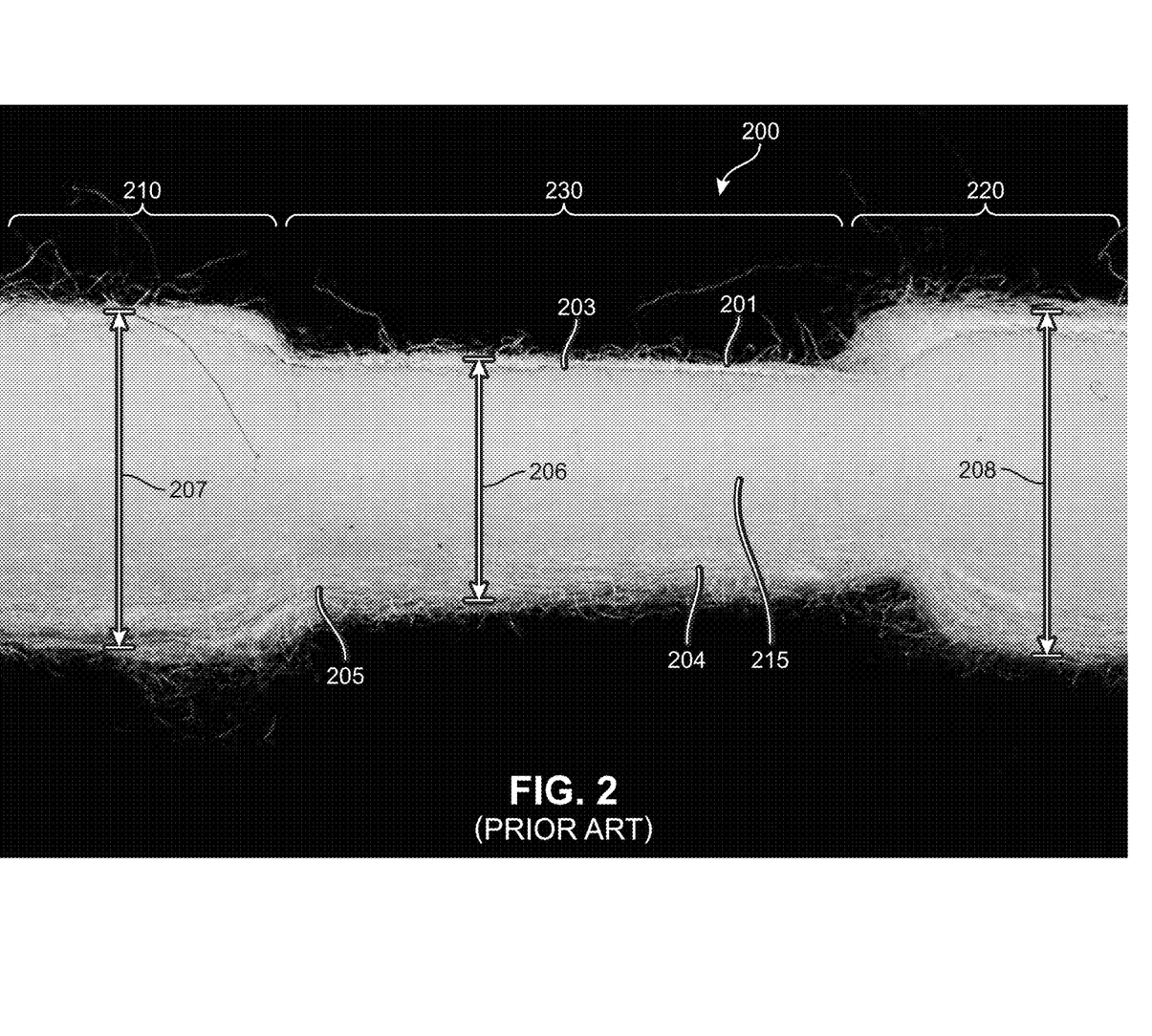
FIG. 2 is an image of an edge view of a material that does not mold.

FIG. 2 illustrates another sample prepared in accordance with Comparative Example 1, but pressed under different conditions. Panel 100 was formed by pressing area 230 of a 1 inch thick batt at 400° F. to about 0.3 inches for 2 minutes. The batt was cooled for 2 minutes in a cold press. Edges 210 and 220 were not pressed. As can be seen, upper surface 201 was not well bonded to the central remainder 215 of the mat. Separation 203 is seen as extending across the width of the pressed area. Separation 205 of lower layer 204 is illustrated in FIG. 2 as a separation spanning essentially the entire width of the pressed area 230. Also, as can be seen, pressed area 230 is between about 60 percent and about 80 percent as thick at 206 as edge 210 is at 207 and as edge 220 is at 208. Thus, insufficient bonding took place in pressed area 230 to hold the pressed shape. Further, the object is not homogenous, as illustrated by the surface banding.

Examples 1, 2, and 3

Three examples of the disclosure, each including non-charring fiber, were prepared. All examples satisfied the UL94 V-0 (2013) flammability standards and were moldable.

TABLE 2

|  |  | Example 1 | Example 2 | Example 3 |
|---|---|---|---|---|
| Charring fiber |  | FR rayon | FR rayon | FR rayon |
| Wt percent | Denier | 70      5 | 75      5 | 60      5 |
| Binding fiber |  | Low-melt | Low-melt | Low-melt |
| Wt percent | Denier | 25      2 | 20      2 | 30      2 |
| Non-charring fiber, wt pct |  | Modacrylic 5 | Modacrylic 5 | Modacrylic 10 |
| Wt charring fiber/Wt binding fiber |  | 2.8 | 3.75 | 2 |
| Charring fiber, denier per fiber/Binding fiber, denier per fiber |  | 2.5 | 2.5 | 2.5 |

TABLE 2-continued

|  | Example 1 | Example 2 | Example 3 |
|---|---|---|---|
| Batt thickness | 1 inch | 1 inch | 1 inch |
| Basis weight | 3.28 osf | 3.28 osf | 3.28 osf |

The flame exposure portion of the UL94 V-0 (2013) flammability standards were run on plural specimens of Example 1, Example 2, and Example 3, in accordance with the test requirements, as set forth below:

TABLE 3

|  | T1, sec | T2, sec | T1 + T2, sec | T3, sec | T2 + T3, Sec | After flame/ glow | Cotton indicator |
|---|---|---|---|---|---|---|---|
| Example 1 | 6 | 2 | 8 | 1 | 3 | Pass | Pass |
| Example 2 | 1 | 0 | 1 | 0 | 1 | Pass | Pass |
| Example 3 | 9 | 6 | 15 | 8 | 14 | Pass | Pass |
| Standards |  |  |  |  |  |  |  |
| After flame time, sec | ≤10 | ≤10 |  |  |  |  |  |
| Total after-flame time, sec |  |  | ≤50 |  |  |  |  |
| After flame time + glow time, sec |  |  |  |  | ≤30 |  |  |

This information indicates that the products of Example 1, Example 2, and Example 3 meet the UL94 V-0 (2013) standards for flammability. The product of Example 2 charred, but neither flashed nor dripped. The product of Example 2 then was divided into 2 sheets 0.5 inches thick. These sheets flashed slightly but did not drip and yielded no base burn length.

The effect of a black scrim is illustrated in Table 4 below, which compares individual test data on three samples of Example 1 without scrim and three samples of Example 1 having black scrim having a basis weight of 30 gsm:

TABLE 4

|  | T1, sec | T2, sec | T3, sec | Drops | Cotton ignited | Burn to the clamp |
|---|---|---|---|---|---|---|
| Without scrim |  |  |  |  |  |  |
| 1 | 1 | 0 | 0 | Pass | Pass | Pass |
| 2 | 0 | 0 | 0 | Pass | Pass | Pass |
| 3 | 1 | 0 | 0 | Pass | Pass | Pass |
| With scrim |  |  |  |  |  |  |
| 1 | 7 | 2 | 1 | Pass | Pass | Scrim Burned |
| 2 | 5 | 1 | 0 | Pass | Pass | Out |
| 3 | 3 | 1 | 1 | Pass | Pass |  |

This data shows that Example 1 of the disclosure passes the UL94 V-0 (2013) standard for inflammability.

A sample of Example 1 also was subjected to acoustical testing, with and without scrim, to determine absorption coefficients across a frequency spectrum, in accordance with ASTM E1050. Table 5 summarizes the results:

TABLE 5

| Frequency, Hz | Example 1 | Example 1 with scrim |
|---|---|---|
| 100 | 0.04371 | 0.05095 |
| 125 | 0.01671 | 0.02262 |
| 160 | 0.04080 | 0.04527 |
| 200 | 0.04666 | 0.04933 |

TABLE 5-continued

| Frequency, Hz | Example 1 | Example 1 with scrim |
|---|---|---|
| 250 | 0.06586 | 0.06569 |
| 315 | 0.09024 | 0.08909 |
| 400 | 0.12268 | 0.11876 |
| 500 | 0.16306 | 0.15907 |
| 630 | 0.21001 | 0.20275 |
| 800 | 0.27499 | 0.25594 |
| 1000 | 0.34317 | 0.33305 |
| 1250 | 0.42466 | 0.42439 |
| 1600 | 0.53129 | 0.53983 |
| 2000 | 0.64226 | 0.65895 |
| 2500 | 0.75710 | 0.78438 |
| 3150 | 0.85704 | 0.88959 |
| 4000 | 0.91308 | 0.95043 |
| 5000 | 0.91598 | 0.95735 |
| 6300 | 0.91770 | 0.91990 |

Figure 3:
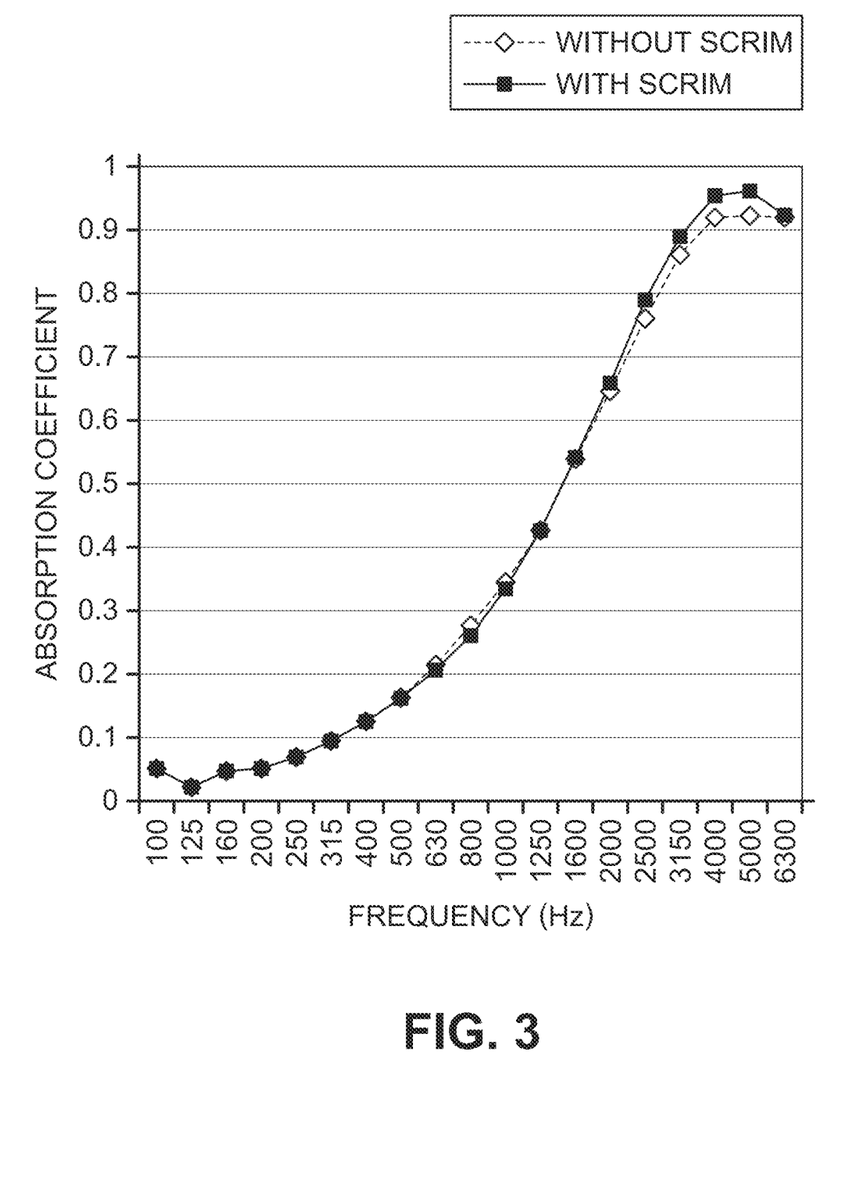
FIG. 3 is a graph that illustrates the sound absorption coefficient of an embodiment of the disclosure.

These results are illustrated graphically in FIG. 3. These results illustrate that materials of the disclosure, including a described scrim, must meet UL94 V-0 (2013) flammability standards and exhibit satisfactory sound attenuation. The results also illustrate the trend toward more complete attenuation as frequency increases.

A panel product was formed by pressing the 1 inch product of Example 1 to between about 0.25 inches and about 0.3 inches at 350° F. for 2 minutes. The resulting product was a somewhat hard yet flexible, constant density profile panel. The panel retained its strength and its structure, and could be tailored to form a softer panel or a firmer panel.

Figure 4:
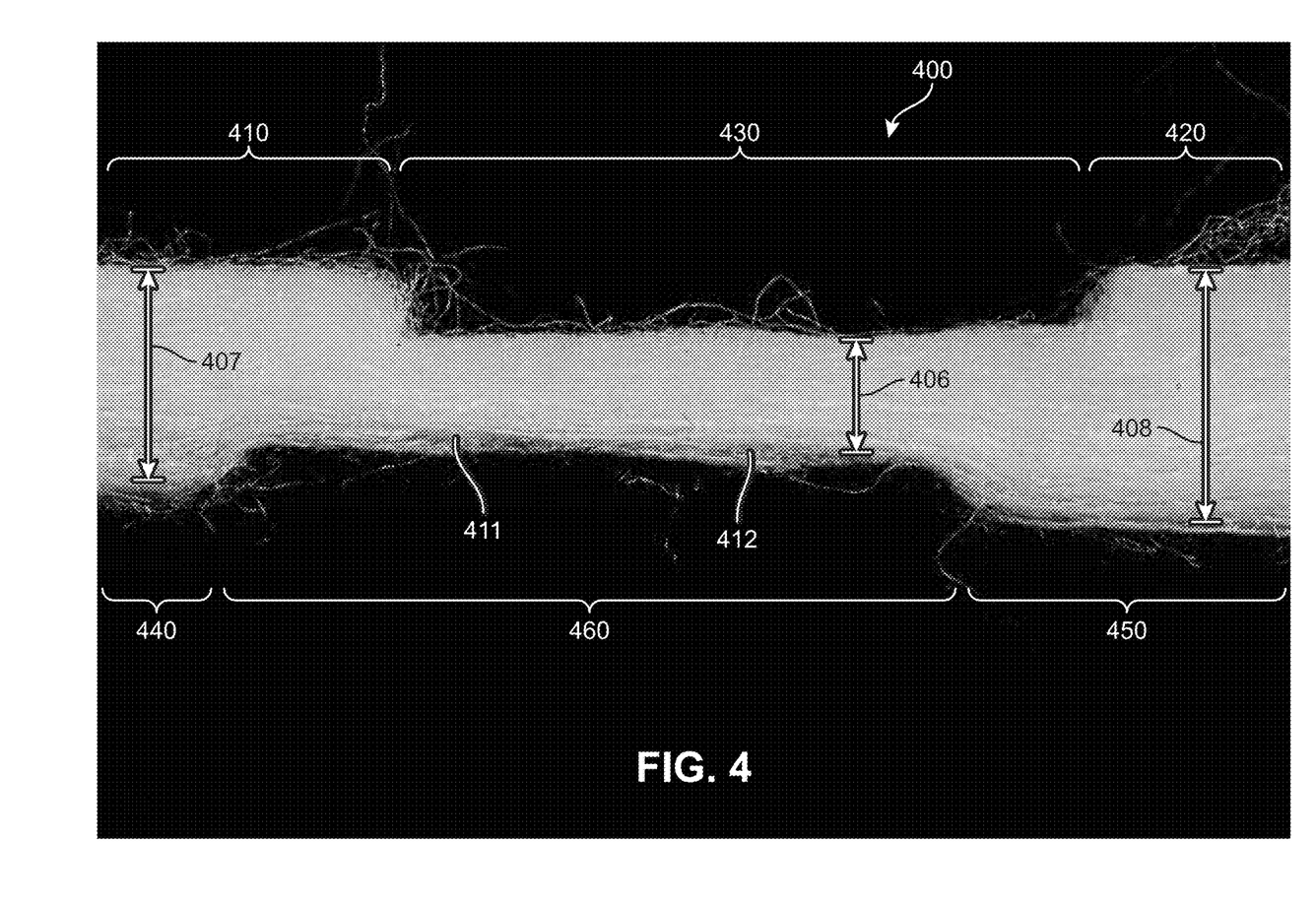
FIG. 4 is an image of an edge view of a molded article in accordance with Example 2 herein.

FIG. 4 illustrates a pressed product of Example 2. The 1 inch thick product of Example 2 was pressed to about 0.3 inches for 2 minutes at 400° F. and then cooled in the press for 2 minutes to produce article 400. The press was not in the same location at the top and bottom of the panel. As can be seen, the pressed areas are 430 at the top and 460 at the bottom. Edge 410, edge 420, edge 440, and edge 450 were not pressed.

The ability of pressed area 430/460 to retain a thickness at 406 between about 40 percent and about 50 percent of the thickness 407 of edge 410/440 or thickness 408 of edge 420/450 illustrates that sufficient bonds were formed when the product 400 was pressed to about 0.3 inches. With the exception of some loose strands at 411 and 412, the pressed area was compact and had uniform density throughout. These dimensions illustrate the ability of the product to maintain both its shape and the loft of the fibrous product to yield the selected result.

Figure 5:
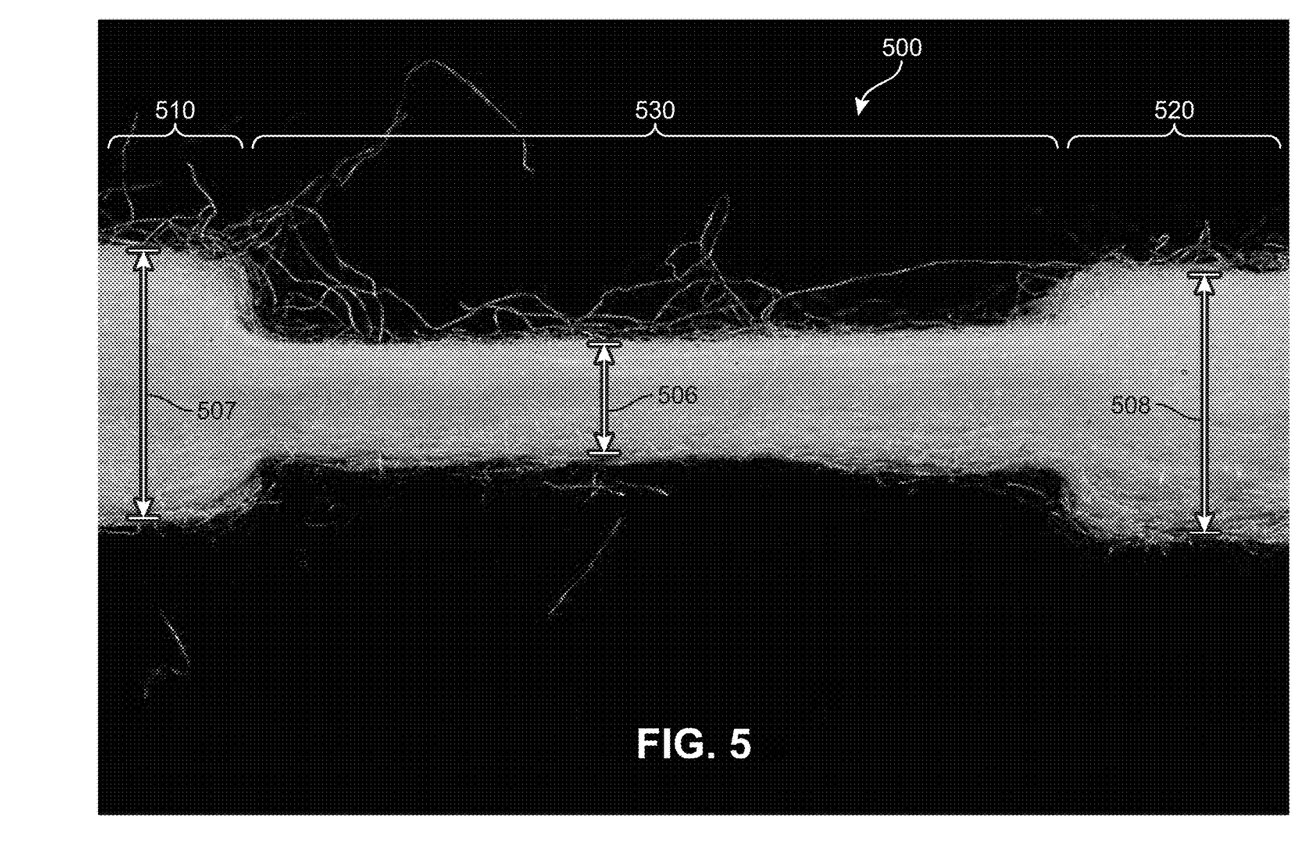
FIG. 5 is an image of an edge view of a molded article in accordance with Example 3 herein.

FIG. 5 illustrates product 500 resulting from pressing a batt prepared in accordance with Example 3. Area 530 was pressed for 2 minutes at 400° F. to a thickness of about 0.3 inches. Edge 510 and edge 520 were not pressed. Area 530 has a thickness at 506 of between about 40 percent and about 45 percent of the thickness at edge 507 and edge 508. FIG. 5 thus illustrates that products of the embodiments herein hold both shape and loft to form an excellent product. As can be seen in FIG. 5, pressed area 530 illustrates a constant density throughout the area.

As can be seen from FIG. 4 and FIG. 5, panel products of the embodiments maintain their shape and integrity. These panels have an essentially consistent density and a coherent binding. The bonding maintains a consistent density and fiber networks that are linked throughout to maintain a lofted structure. Such a structure may be appropriate for sound and flame suppression. These products illustrate the types of products that can be obtained. Embodiments of the disclosure retained their shape, and can be tailored to yield a soft panel or a firmer panel that retains a shape into which it is pressed.

Figure 6:
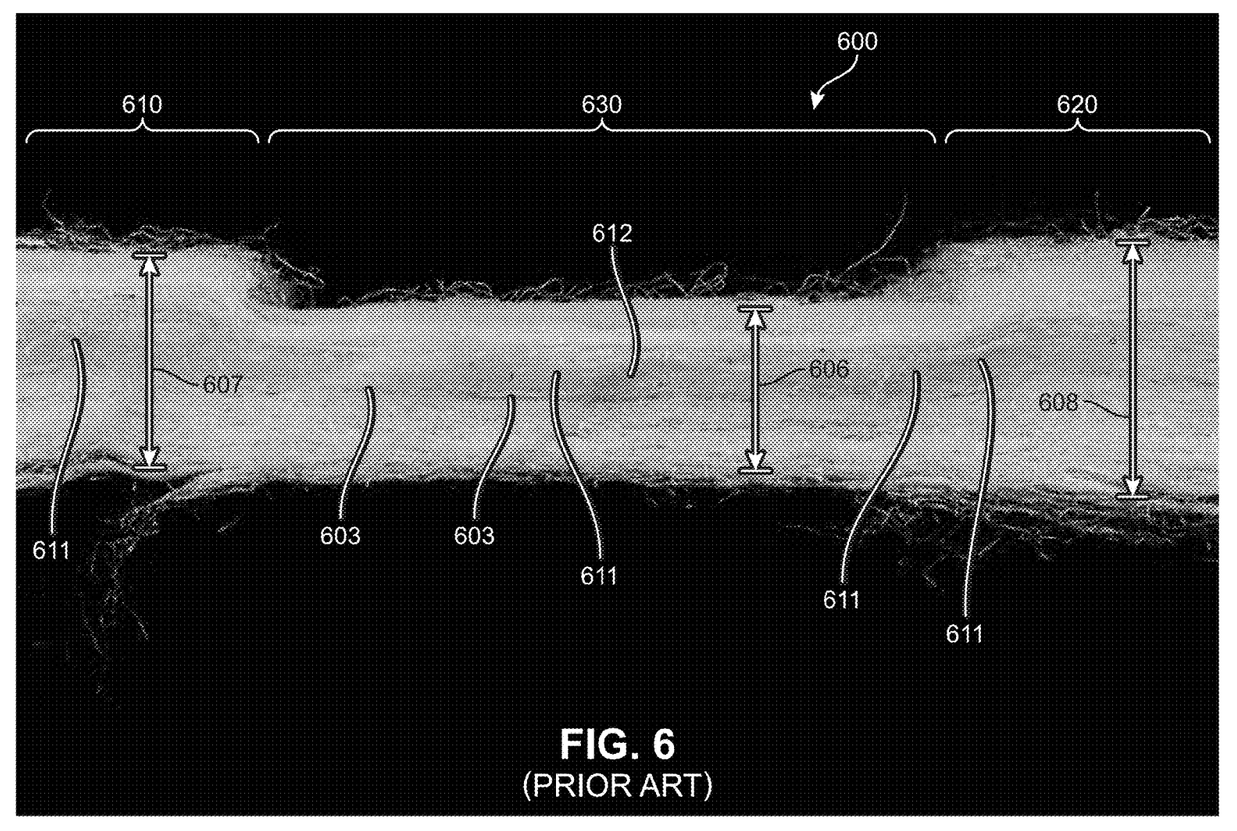
FIG. 6 is an image of an edge view of a material that does not mold.

FIG. 6 illustrates Comparative Example 3, panel 600, which is not an embodiment of this disclosure. Product 600 does not exhibit bonding strength sufficient to retain a pressed structure. Edge 610 and edge 620 remain approximately at the thickness of the batt. Pressed area 630 was heated at 400° F. for 2 minutes and then cooled for 2 minutes. Area 630 retained a thickness at 606 of between about 80 percent and about 90 percent of the thickness 607 of edge 610 or the thickness 608 of edge 620. This dimension indicates that the pressed thickness, which was about 0.30 inches, was not maintained by the product. Thus, bonding was insufficient to maintain a structure required of a product of an embodiment herein. Also, as can be seen in FIG. 6, a large discontinuity 611 extends across the width of product 600. This discontinuity appears to have left area 612 as an undesirable low density area in pressed area 630. In particular, regions 603 are voids that form part of discontinuity 611.

While various embodiments have been described, the description is intended to be exemplary, rather than limiting and it will be apparent to those of ordinary skill in the art that many more embodiments and implementations are possible that are within the scope of the present embodiments. For example, a different binding fiber, such as a core and sheath binding fiber, may be used. Similarly, a charring fiber different from flame-retardant rayon may be used. Accordingly, the present embodiments are not to be restricted except in light of the attached claims and their equivalents. Also, various modifications and changes may be made within the scope of the attached claims.

What is claimed is:

1. A non-woven panel comprising:
charring fiber having a denier per fiber at least about 3,
binding fiber having a denier per fiber between about 1 and about 8,
wherein the weight ratio of charring fiber to binding fiber is between about 2:1 and about 4:1,
wherein the denier per fiber of the charring fiber is at least about twice the denier per fiber of the binding fiber,
less than about 10 wt percent, based on the total weight of the charring fiber and the binding fiber, of a composition selected from the group consisting of non-charring fiber, flame retardants, and blends thereof,
wherein the panel has at least one of a flat or contoured shape and retains the at least one of a flat or contoured shape,
wherein the panel has a basis weight of between about 0.5 osf and about 9 osf, and
wherein the panel meets at least one of the UL94 V-0 (2013) flammability standard or the ASTM E84-14 (2014) flammability standard.

2. The panel of claim 1, wherein the charring fiber comprises flame-retardant rayon.

3. The panel of claim 1, wherein the weight ratio of charring fiber to binding fiber is between about 2.5 and about 3.75.

4. The panel of claim 3, wherein the denier per fiber of the charring fiber is between about 4 and about 6.

5. The panel of claim 4, wherein the denier per fiber of the binding fiber is between about 1 and about 3.

6. The panel of claim 1, wherein the binding fiber comprises a bi-component polyester fiber.

7. The panel of claim 1, wherein the panel has a thickness of between about 10 mm and about 25 mm.

8. A molded article comprising a non-woven material comprising:
charring fiber having a denier per fiber at least about 3,
binding fiber having a denier per fiber between about 1 and about 8,
wherein the weight ratio of charring fiber to binding fiber is between about 2:1 and about 4:1,
wherein the denier per fiber of the charring fiber is at least about twice the denier per fiber of the binding fiber,
less than about 10 wt percent, based on the total weight of the charring fiber and the binding fiber, of a composition selected from the group consisting of non-charring fiber, flame retardants, and blends thereof,
wherein the article has a contoured shape,
wherein the article has a basis weight of between about 0.5 osf and about 9 osf, and
wherein the article meets at least one of the UL94 V-0 (2013) flammability standard or the ASTM E84-14 (2014) flammability standard.

9. The article of claim 8, wherein the binding fiber comprises a bi-component polyester fiber.

10. The article of claim 9, wherein the charring fiber comprises flame-retardant rayon.

11. The article of claim 8, wherein the article maintains its size after being tested and meeting the at least one of the UL94 V-0 (2013) flammability standard or the ASTM E84-14 (2014) flammability standard.

12. The article of claim 11, wherein the article is an acoustical and insulating device for an automobile.

13. The article of claim 12, wherein the article has a thickness of between about 10 mm and about 25 mm.

14. A method for manufacturing a non-woven panel, the method comprising:
carding charring fiber and cross-lapping the carded fibers to form a batt, wherein the charring fiber has a denier per fiber at least about 3,
adding binding fiber to create a fiber blend, wherein the binding fiber has a denier per fiber between about 1 and about 8,
wherein the weight ratio of charring fiber to binding fiber is between about 2:1 and about 4:1,
wherein the denier per fiber of the charring fiber is at least about twice the denier per fiber of the binding fiber,
wherein the panel includes less than about 10 wt percent, based on the total weight of the charring fiber and the binding fiber, of a composition selected from the group consisting of non-charring fiber, flame retardants, and blends thereof,
thermally bonding fibers of the fiber blend by melting a low-melt temperature binder to form the panel, which has at least one of a flat or contoured shape and retains the at least one of a flat or contoured shape,
wherein the panel has a basis weight of between about 0.5 osf and about 9 osf, and
wherein the panel meets at least one of the UL94 V-0 (2013) flammability standard or the ASTM E84-14 (2014) flammability standard.

15. The method of claim 14, further comprising pressing the batt while the binder is melted to form the panel with a thickness between about 10 mm and about 25 mm.

16. The method of claim 14, wherein the binding fiber comprises a bi-component polyester fiber.

17. The method of claim 15, further comprising:
cold pressing the panel while the binder is melted to form a selected shape; and
cooling the selected shape.

18. The method of claim 17, wherein the panel is cold pressed to form the selected shape with a thickness between about 10 mm and about 25 mm.

19. A method for manufacturing an article comprising a non-woven material, the method comprising:
heating a panel of thermally bonded fibers to a temperature sufficient to melt a low-melting temperature binder,
wherein the thermally bonded fibers comprise charring fiber and binding fiber,
wherein the charring fiber has a denier per fiber at least about 3,
wherein the binding fiber has a denier per fiber between about 1 and about 8,
wherein the weight ratio of charring fiber to binding fiber is between about 2:1 and about 4:1,
wherein the denier per fiber of the charring fiber is at least about twice the denier per fiber of the binding fiber;
wherein the panel includes less than about 10 wt percent, based on the total weight of the charring fiber and the binding fiber, of a composition selected from the group consisting of non-charring fiber, flame retardants, and blends thereof,
cold pressing the panel to form the article to have a selected shape,
cooling the article to maintain the selected shape,
wherein the article has a contoured shape and retains the contoured shape,
wherein the panel has a basis weight of between about 0.5 osf and about 9 osf, and
wherein the article meets at least one of the UL94 V-0 (2013) flammability standard or the ASTM E84-14 (2014) flammability standard.

20. The method of claim 19, further comprising cold pressing the panel such that the selected shape of the article has a thickness between about 10 mm and about 25 mm.

21. The non-woven panel of claim 1, wherein the panel retains its size after being tested and meeting at least one of the UL94 V-0 (2013) flammability standard or the ASTM E84-14 (2014) flammability standard.

* * * * *